(12) United States Patent
Eulau et al.

(10) Patent No.: US 6,411,910 B1
(45) Date of Patent: Jun. 25, 2002

(54) SYSTEM AND METHOD FOR ESTIMATING POWER AVAILABILITY

(75) Inventors: Wendy B. Eulau, Newport; Piyush Saxena, Warwick, both of RI (US); Neil Rasmussen, Concord, MA (US)

(73) Assignee: American Power Conversion, West Kingston, RI (US)

(*) Notice: Subject to any disclaimer, the term of this patent is extended or adjusted under 35 U.S.C. 154(b) by 0 days.

(21) Appl. No.: 09/559,132

(22) Filed: Apr. 26, 2000

(51) Int. Cl.[7] .............................................. G01R 21/00
(52) U.S. Cl. .............................. 702/60; 703/13; 703/22; 700/291
(58) Field of Search .............................. 702/60, 57, 61, 702/64, 183, 188; 700/51, 108, 291; 307/126; 703/6, 13, 22; 235/151.21

(56) References Cited

U.S. PATENT DOCUMENTS 6,151,568 A * 11/2000 Allen et al. .................... 703/14
6,199,018 B1 * 3/2001 Quist et al. .................... 702/34

* cited by examiner

Primary Examiner—John S. Hilten
Assistant Examiner—Tung Lau
(74) Attorney, Agent, or Firm—Mintz, Levin, Cohn, Ferris, Clovsky and Popeo, P.C.

(57) ABSTRACT

An Internet-based system and method is set forth for estimating power availability and business process downtime based on specific attributes of a building and business process components contained therein. The system includes a power availability estimator computer coupled to a plurality of user computers via a computer network. The power availability estimator computer can be programmed with a power availability estimator engine, which calculates or estimates the probability that electrical power will be available and/or downtime for a particular building on an annual basis. The power availability estimator engine includes a plurality of equations that cooperate with a probability density function graph to calculate the estimated power availability and business process downtime.

29 Claims, 19 Drawing Sheets

Fig. 4

| Process | Attribute | Customer Resp. | AS | AD | A | BS | BO | B | C | DS | DO | D | E | F | G |
|---|---|---|---|---|---|---|---|---|---|---|---|---|---|---|---|
| Bulk/Area/Local Distribution | Geography | Connecticut | 120.00 | 20.00 | 140.00 | 0.00200 | 0.00600 | 0.01000 | 0 | 0.00000250 | 0.00000900 | 0.0001150 | 0 | 0 | 0 |
| Bulk/Area/Local Distribution | Type of geographic area is your building / facility located? | City | 7.00 | 1.24 | 8.24 | 0.00100 | 0.00340 | 0.00440 | 0 | 0.00000040 | 0.00000140 | 0.0000180 | 0 | 100 | 0 |
| | | Suburb | 2.00 | 0.35 | 2.35 | 0.00500 | 0.00170 | 0.00670 | 0 | 0.00000010 | 0.00000034 | 0.0000044 | 0 | 25 | 0 |
| | | Rural | 4.50 | 0.80 | 5.3 | 0.00075 | 0.00260 | 0.00335 | 0 | 0.00000025 | 0.00000086 | 0.0000111 | 0 | 50 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Service Panel | Neighborhood Construction? | Yes | 4.50 | 0.80 | 5.3 | 0.00075 | 0.00260 | 0.00335 | 0 | 0.00000010 | 0.00000034 | 0.000044 | 0 | 25 | 0 |
| | | No | 0.00 | 0.00 | 0 | 0.000000 | 0.000000 | 0.000000 | 0 | 0.00000000 | 0.00000000 | 0.000000 | 0 | 0 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Service Panel | How close to Substation? | < 2 Miles | 1.50 | 0.27 | 1.77 | 0.00040 | 0.00140 | 0.00180 | 0 | 0.00000008 | 0.00000027 | 0.000035 | 0 | 25 | 0 |
| | | 2-10 Miles | 3.00 | 0.53 | 3.53 | 0.00065 | 0.00220 | 0.00285 | 0 | 0.00000015 | 0.00000051 | 0.000066 | 0 | 50 | 0 |
| | | > 10 Miles | 5.00 | 0.88 | 5.88 | 0.00090 | 0.00310 | 0.00400 | 0 | 0.00000020 | 0.00000068 | 0.000088 | 0 | 100 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Service Panel | Is Wiring to building above/underground? | Above | 4.50 | 0.80 | 5.3 | 0.00100 | 0.00340 | 0.00440 | 0 | 0.00000020 | 0.00000068 | 0.000088 | 0 | 50 | 0 |
| | | Under | 1.00 | 0.18 | 1.18 | 0.00050 | 0.00170 | 0.00220 | 0 | 0.00000008 | 0.00000027 | 0.000035 | 0 | 25 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Outlet | Age of Building? | < 10 Years Old | 1.50 | 0.27 | 1.77 | 0.00020 | 0.00069 | 0.00089 | 0 | 0.00000004 | 0.00000013 | 0.000017 | 0 | 20 | 0 |
| | | 11-30 Years Old | 3.00 | 0.53 | 3.53 | 0.00040 | 0.00140 | 0.00180 | 0 | 0.00000007 | 0.00000024 | 0.000031 | 0 | 40 | 0 |
| | | 31-60 Years Old | 4.50 | 0.80 | 5.3 | 0.00060 | 0.00210 | 0.00270 | 0 | 0.00000010 | 0.00000034 | 0.000044 | 0 | 60 | 0 |
| | | 61-100 Years Old | 6.00 | 1.06 | 7.06 | 0.00080 | 0.00280 | 0.00360 | 0 | 0.00000013 | 0.00000044 | 0.000057 | 0 | 80 | 0 |
| | | > 100 Years Old | 7.50 | 1.33 | 8.83 | 0.00100 | 0.00340 | 0.00440 | 0 | 0.00000016 | 0.00000054 | 0.000070 | 0 | 100 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Outlet | Age of Wiring? | <10 Years Old | 1.50 | 0.27 | 1.77 | 0.00025 | 0.00086 | 0.00111 | 0 | 0.00000004 | 0.00000013 | 0.000017 | 0 | 25 | 0 |
| | | 11-30 Years Old | 3.50 | 0.62 | 4.12 | 0.00050 | 0.00170 | 0.00220 | 0 | 0.00000007 | 0.00000024 | 0.000031 | 0 | 50 | 0 |
| | | 31-60 Years Old | 5.50 | 0.97 | 6.47 | 0.00075 | 0.00260 | 0.00335 | 0 | 0.00000010 | 0.00000034 | 0.000044 | 0 | 75 | 0 |
| | | >60 Years Old | 7.50 | 1.33 | 8.83 | 0.00100 | 0.00340 | 0.00440 | 0 | 0.00000013 | 0.00000044 | 0.000057 | 0 | 100 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Outlet | In-Building Construction | Yes | 4.50 | 0.80 | 5.3 | 0.00080 | 0.00280 | 0.00360 | 0 | 0.00000010 | 0.00000034 | 0.000044 | 0 | 25 | 0 |
| | | No | 0.00 | 0.00 | 0 | 0.000000 | 0.000000 | 0.000000 | 0 | 0.00000000 | 0.00000000 | 0.000000 | 0 | 0 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Outlet | Heavy Equipment Startup | Yes | 4.50 | 0.80 | 5.3 | 0.00100 | 0.00340 | 0.00440 | 0 | 0.00000010 | 0.00000034 | 0.000044 | 0 | 25 | 0 |
| | | No | 0.00 | 0.00 | 0 | 0.000000 | 0.000000 | 0.000000 | 0 | 0.00000000 | 0.00000000 | 0.000000 | 0 | 0 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Outlet | Type of Facility? | Office | 2.00 | 0.35 | 2.35 | 0.00040 | 0.00140 | 0.00180 | 0 | 0.00000050 | 0.00000170 | 0.000220 | 0 | 50 | 0 |
| | | Industrial | 4.00 | 0.71 | 4.71 | 0.00060 | 0.00210 | 0.00270 | 0 | 0.00000100 | 0.00000340 | 0.000440 | 0 | 50 | 0 |
| | | Residential | 6.00 | 1.06 | 7.06 | 0.00080 | 0.00280 | 0.00360 | 0 | 0.00000150 | 0.00000520 | 0.000670 | 0 | 75 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Outlet | Process Expansion? | Yes | 4.50 | 0.80 | 5.3 | 0.00100 | 0.00340 | 0.00440 | 0 | 0.00000010 | 0.00000034 | 0.000044 | 0 | 25 | 0 |
| | | No | 0.00 | 0.00 | 0 | 0.000000 | 0.000000 | 0.000000 | 0 | 0.00000000 | 0.00000000 | 0.000000 | 0 | 0 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |
| Outlet | IEEE Standards | Yes | 1.50 | 0.27 | 1.77 | 0.00050 | 0.00170 | 0.00220 | 0 | 0.00000055 | 0.00000017 | 0.000022 | 0 | 25 | 0 |
| | | No | 15.00 | 2.65 | 17.65 | 0.00500 | 0.01700 | 0.02200 | 0 | 0.00000600 | 0.00002100 | 0.002700 | 0 | 150 | 0 |
| | | Ideal | 0.00 | 0.00 | 0 | 0.000000 | 0.000000 | 0.000000 | 0 | 0.00000000 | 0.00000000 | 0.000000 | 0 | 0 | 0 |

▷ Create New Process

⊚ Process Location
Where is your business process located?  Help

| Step 1 | Step 2 | Step 3 |
|---|---|---|
| Select your geography from the menu below: | Next, select your region from the menu below: | Then, select your location from the menu below: |
| North America ▼ | United States ▼ | Massachusetts ▼ |

Fig. 5

[HOME] [PRODUCTS] [SUPPORT] [SERVICES] [UPS SELECTOR] [HOW TO BUY]

*Search Site Map Contact Us*

▷ Create New Process

▷ Edit Process Location

⊚ Site Information for Business Process

1. Is your business process located in a city, suburb, or rural area?  Help
   [City ▼]

2. Is there currently any construction in your neighborhood?  Help
   [Yes ▼]

3. How close are you to the nearest electric substation?  Help
   [< 2 Miles ▼]

4. Is the wiring to your building above or under ground?  Help
   [Under ▼]

5. Is your business process in an office, industrial, or residential facility?  Help
   [Office ▼]

6. How old is your facility?  Help
   [11-30 Year Old ▼]

7. How old is your wiring in your facility?  Help
   [< 10 Year Old ▼]

8. Is there currently any construction within your building?  Help
   [Yes ▼]

9. Do you have heavy equipment operating in your facility?  Help
   [Yes ▼]

10. Is your business process currently undergoing any expansion?  Help
    [No ▼]

11. Has your building been audited/upgraded to meet IEEE Standards ?  Help
    [No ▼]

▷ Create New Process

▷ Edit Process Location　　　　　　　　▷ Edit Site Info.

◎ Components of Business Process
Select the components below that make up your business process:

☑ Internettworking Devices (Hubs, Routers, Switches)
☑ Mainframes
☑ Servers
☑ Telecom Devices
☑ Workstations
☐ Other 1 (specify): _____
☐ Other 2 (specify): _____
☐ Other 3 (specify): _____
　　　　　　　　　　　　[Continue]

[HOME] [PRODUCTS] [SUPPORT] [SERVICES] [UPS SELECTOR] [HOW TO BUY]

Search  Site Map  Contact Us

▷ Create New Process

▷ Edit Process Location      ▷ Edit Site Info.      ▷ Add Component(s)

◉ Internetworking device Information

1. How many internetworking devices are used in this process?

[25]

2. What percent of those internetworking devices are protected by a UPS? Help

[25% ▼]

3. What percent of those UPSs have automatic voltage regulation (AVR)? Help

[25% ▼]

4. What is the average runtime for the UPSs on the internetworking devices?

[10 ▼] Hrs. [0 ▼] Min. [0 ▼] Sec.

5. How long dose it take to reboot the internetworking devices after a power event? Help

[10 ▼] Hrs. [0 ▼] Min. [0 ▼] Sec.

6. Are these internetworking devices protected by a generator? Help

○ Yes  ⦿ No

7. If so, what is the startup time of the generator? Help

[0 ▼] Hrs. [0 ▼] Min. [0 ▼] Sec.

[HOME] [PRODUCTS] [SUPPORT] [SERVICES] [UPS SELECTOR] [HOW TO BUY]

*Search  Site Map  Contact Us*

▷ Create New Process

▷ Edit Process Location    ▷ Edit Site Info.    ▷ Add Component(s)    ▷ Edit Cost Info.

⊚ Mainframe Information

1. How many mainframes are used in this process?
   [2]

2. What percent of those mainframes are protected by a UPS? Help
   [25%]

3. What percent of those UPSs have automatic voltage regulation (AVR)? Help
   [25%]

4. What is the average runtime for the UPSs on the mainframes?
   [10] Hrs. [0] Min. [0] Sec.

5. How long does it take to reboot the mainframes after a power event? Help
   [10] Hrs. [0] Min. [0] Sec.

6. Are these mainframes protected by a generator? Help
   ○ Yes  ⦿ No

7. If so, what is the startup tine of the generator? Help
   [0] Hrs. [0] Min. [0] Sec.

Fig. 9

[HOME] [PRODUCTS] [SUPPORT] [SERVICES] [UPS SELECTOR] [HOW TO BUY]

Search  Site Map  Contact Us

▷ Create New Process

▷ Edit Process Location    ▷ Edit Site Info.    ▷ Add Component(s)    ▷ Edit Cost Info.

◉ Server Information

1. How many servers are used in this process?
   [15]

2. What percent of those servers are protected by a UPS?  Help
   [25% ▼]

3. What percent of those UPSs have automatic voltage regulation (AVR)?  Help
   [25% ▼]

4. What is the average runtime for the UPSs on the servers ?
   [10 ▼] Hrs. [0 ▼] Min. [0 ▼] Sec.

5. How long does it take to reboot the servers after a power event?  Help
   [0 ▼] Hrs. [0 ▼] Min. [0 ▼] Sec.

6. Are these servers protected by a generator?  Help
   ○ Yes  ◉ No

7. If so, what is the startup tine of the generator?  Help
   [0 ▼] Hrs. [0 ▼] Min. [0 ▼] Sec.

[HOME] [PRODUCTS] [SUPPORT] [SERVICES] [UPS SELECTOR] [HOW TO BUY]

*Search   Site Map   Contact Us*

▷ Create New Process

▷ Edit Process Location    ▷ Edit Site Info.    ▷ Add Component(s)    ▷ Edit Cost Info.

⊚ Telecom device Information

1. How many telecom devices are used in this process?
   [15]

2. What percent of those telecom devices are protected by a UPS? Help
   [15%]

3. What percent of those UPSs have automatic voltage regulation (AVR)? Help
   [15%]

4. What is the average runtime for the UPSs on the telecom devices?
   [4] Hrs. [0] Min. [0] Sec.

5. How long does it take to reboot the telecom devices after a power event? Help
   [10] Hrs. [0] Min. [0] Sec.

6. Are these telecom devices protected by a generator? Help
   ○ Yes  ⊙ No

7. If so, what is the startup time of the generator? Help
   [0] Hrs. [0] Min. [0] Sec.

[HOME] [PRODUCTS] [SUPPORT] [SERVICES] [UPS SELECTOR] [HOW TO BUY]

*Search Site Map Contact Us*

▷ Create New Process

▷ Edit Process Location    ▷ Edit Site Info.    ▷ Add Component(s)    ▷ Edit Cost Info.

⊚ Workstation Information

1. How many workstations are used in this process?
   `15`

2. What percent of those workstations are protected by a UPS? Help
   `15%`

3. What percent of those UPSs have automatic voltage regulation (AVR)? Help
   `10%`

4. What is the average runtime for the UPSs on the workstations ?
   `6` Hrs. `0` Min. `0` Sec.

5. How long does it take to reboot the workstations after a power event? Help
   `5` Hrs. `0` Min.  `0` Sec.

6. Are these workstations protected by a generator? Help
   ○ Yes  ⊙ No

7. If so, what is the startup time of the generator? Help
   `0` Hrs. `0` Min. `0` Sec.

[HOME] [PRODUCTS] [SUPPORT] [SERVICES] [UPS SELECTOR] [HOW TO BUY]

*Search  Site Map  Contact Us*

▷ Create New Process

▷ Edit Process Location      ▷ Edit Site Info.      ▷ Add Component(s)

● Process and Cost Information

1. How many employees use this process?
   [250]

2. What is the average annual cost per employee? Help
   [$5,000.00]

3. When the process is unavailable, what percent of employee time is wasted?
   [70% ▼]

4. How much revenue dose the process support/generate per year? Help
   [$5,000,000.00]

5. What percent of the revenue cannot be recovered if the process is down?
   [30% ▼]

6. What is your company's target profit margin? Help
   [60] %

7. How many days a week does this process run? Help
   [5 ▼]

8. How many hours a days does this process run? Help
   [12 ▼]

[Generate Availability Profile]

Fig. 13

◎ Service Panel Availability

Summary of Inputs

| | |
|---|---|
| Where is this process located? | Massachusetts |
| Is your business located in a city, suburb, or rural area? | City |
| Is there currently any construction in your neighborhood? | Yes |
| How close are you to the nearest electric substation? | < 2 Miles |
| Is the wiring to your building above or under the ground? | Under |

Power Event Distribution at Service Panel

| Duration of event | Number of Events in Range | Brownout Events | Outage Events |
|---|---|---|---|
| < 1 seconds | 60.04 | 52.41 | 7.63 |
| 1 seconds - 10 minutes | 14.73 | 3.06 | 11.67 |
| 10 minutes - 1.5 hours | 0.89 | 0.10 | 0.79 |
| > 1.5 hours | 0.22 | 0.03 | 0.19 |
| Total Events | 75.88 | 55.6 | 20.28 |

Downtime & Availability

| Location | Yearly Downtime (hours) | Availability |
|---|---|---|
| Service Panel | 2.38 | 99.97285 % |

Fig. 15

[HOME] [PRODUCTS] [SUPPORT] [SERVICES] [UPS SELECTOR] [HOW TO BUY]
*Search  Site Map  Contact Us*

Outlet Availability                                                                [Edit]

Summary of Inputs

| | |
|---|---|
| Is your business process in an office, industrial, or residential facility? | Office |
| How old is your facility? | 11-30 Years Old |
| How old is your wiring in your facility? | < 10 years old |
| Is there currently any construction within your building? | Yes |
| Do you have heavy equipment operating in your facility? | Yes |
| Is your business process currently undergoing any expansion? | No |
| Has your building been audited/upgraded to meet IEEE Standards? | No |

Power Event Distribution at Outlet

| Duration of event | Number of Events in Range | Brownout Events | Outage Events |
|---|---|---|---|
| < 1 seconds | 35.90 | 30.50 | 5.40 |
| 1 seconds - 10 minutes | 20.79 | 4.70 | 16.09 |
| 10 minutes - 1.5 hours | 1.47 | 0.33 | 1.14 |
| > 1.5 hours | 0.09 | 0.02 | 0.07 |
| Total Events | 58.25 | 35.55 | 22.7 |

Downtime & Availability

| Location | Yearly Downtime (hours) | Availability |
|---|---|---|
| Outlet | 6.32 | 99.92791 % |

Downtime Distribution

| | |
|---|---|
| Percent Downtime caused by events external to building: | 37.7 % |
| Percent Downtime caused by events internal to building: | 62.3 % |

[Return to Availability Reporting Points]

Fig. 16

HOME  PRODUCTS  SUPPORT  SERVICES  UPS SELECTOR  HOW TO BUY

Search  Site Map  Contact Us

▷ Create New Process        ▷ View Profile
▷ Edit Process Location     ▷ Edit Site Info.    ▷ Add Component(s)    ▷ Edit Cost Info.

Component Availability

Internetworking devices       Mainframes              Servers

Availability: 95.86670 %    Availability: 95.86670 %    Availability: 99.98069 %

Telecom devices             Workstations

Availability: 95.31568 %    Availability: 97.64690 %

Return to Availability Reporting Points

Fig. 17

○ Overall Process Downtime and Power Availability Report

Overall Annual Process Downtime:     410.35 hours
Overall Process Availability:     95.31568%
Weakest Link of the Process     Telecom devices

Estimated Annual Component Downtime (hours)

| Internetworking devices | | " | 362.08 |
| Mainframes | | " | 362.08 |
| Servers | 1.69 | | |
| Telecom devices | | " | 410.35 |
| Workstations | 206.13 | | |

Return to Availability Reporting Points

[HOME] [PRODUCTS] [SUPPORT] [SERVICES] [UPS SELECTOR] [HOW TO BUY]

*Search  Site Map  Contact Us*

Revenue & Profit Risk

Summary of Inputs

| | |
|---|---:|
| How many employees use this process? | 250 |
| What is the average annual cost per employee? | $5,000.00 |
| When the process is unavailable, what percent of employee time is wasted? | 70 % |
| How much revenue does the process support/generate per year? | $5,000,000.00 |
| What percent of the revenue is lost if this process is down? | 30 % |
| What is your company's target margin? | 60 % |
| How many days a week does this process run? | 5 |
| How many hours a day does this process run? | 12 |

Revenue & Profit Impact

| | |
|---|---:|
| Revenue loss per hour due to lack of employee productivity: | $467.41 |
| Top line revenue loss per hour: | $480.77 |
| Total Revenue Loss per Hour: | $948.18 |
| Total Profit Loss per Hour: | $568.91 |
| Total Estimated Downtime: | 410.35 hours |
| Total Annual Revenue $ At Risk: | $389,084.14 |
| Total Annual Profit $ At Risk: | $233,450.48 |

[Return to Availability Reporting Points]

Fig. 19

SYSTEM AND METHOD FOR ESTIMATING POWER AVAILABILITY

FIELD OF THE INVENTION

The present invention relates generally to a system and method for estimating power availability and its relation to business process downtime, and more specifically to a system and method for estimating both the annual power availability and downtime of a business process.

BACKGROUND

Utility power distribution generally starts with generation of the power by a power generation facility, i.e., power generator or power plant. The power generator supplies power through step-up subtransmission transformers to transmission lines. To reduce power transportation losses, the step-up transformers increase the voltage and reduce the current. The actual transmission line voltage conventionally depends on the distance between the subtransmission transformers and the users or customers. Distribution substation transformers reduce the voltage from transmission line level generally to a range of about 2–35 kilo-volts ("kV"). The primary power distribution system delivers power to distribution transformers that reduce the voltage still further to approximately 120 V to 600 V.

Power utility companies, and suppliers thereto, have developed systems to analyze and manage power generated and power to be delivered to the transmission lines in the primary power distribution system, i.e., primarily through supervisory control and data acquisition. These primary power distribution analyzing systems are complex, expensive, and typically do not analyze power that is delivered to the industrial, commercial, or residential customer sites through the secondary power distribution system.

Various distribution systems and environmental factors, however, can significantly contribute to electrical power related problems for a particular building. Some examples of power related problems include harmonic distortion, voltage spikes, surges, or sags, as well as blackouts, or brownouts. These power related problems associated with various distribution systems greatly affect the quality and quantity of power received by the power customer at its facility or building. In some instances, a power customer's building may experience significant business process disruptions or downtime due to the aforementioned power related problems. This downtime can render the power customer's business process unavailable for business process operation and/or production. Since these power related problems can be intermittent, they can be difficult to forecast or predict, thereby requiring business process operators to conservatively estimate their production goals. The difference between conservatively estimated production goals and actual production capacity can be substantial. Moreover, the difference between annual profits associated with conservatively estimated production goals and annual profits associated with actual production capacity can also be substantial. Thus, it is desirable to operate a business process at a higher or actual production capacity with associated higher profits rallier than at a lower or more conservatively estimated production goal with associated lower profits. However, if business process operators commit to providing an output based on actual production capacity they may be unable to fulfill their commitments due to unforeseen power related problems and associated business process downtime. As a result, business process operators have been limited to conservatively estimating their production goals.

Therefore, an unsolved need remains for a system and method for estimating business process downtime and/or availability that overcomes the above described limitations and deficiencies of the prior art.

SUMMARY OF THE INVENTION

In accordance with principles of the present invention, an Internet-based system and method is set forth for estimating power availability and its relation to business process downtime. Estimation of power availability can be based on specific attributes of a building and business process components contained therein.

In one embodiment of the present invention, a system includes a power availability estimator computer coupled to a plurality of user computers via a computer network. The power availability estimator computer can contain a power availability estimator engine which calculates or estimates the probability that electrical power will be available and an associated downtime for a particular building on an annual basis. The power availability estimator engine includes a plurality of equations that cooperate with a probability density function graph to calculate the estimated power availability and business process downtime. The probability density function graph includes a horizontal axis defining a duration of electrical power events and a vertical axis defining, a frequency of electrical power events.

In another embodiment of the present invention, a method for using the system for estimating power availability and business process downtime in accordance with embodiments of the present invention comprises the steps of: selecting geographical data corresponding to a user's building location; selecting site data related to the user's building; selecting component and/or equipment data; selecting business process and costs of downtime related data; electing to generate a service panel report; generating the service panel report; electing to generate an outlet report; generating the outlet report; electing to generate a component and/or equipment power availability report; generating the component and/or equipment power availability report; electing to generate an overall business process downtime and overall power availability report; generating overall business process downtime and overall power availability report; electing to generate a revenue and profit and/or risks report; generating the revenue and profit and/or risks report, electing to generate a total power availability and business process downtime report; generating the total power availability and business process downtime report.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 4 is an exemplary look-up table including a plurality of values related to the probability density function graph shown in FIG. 2;

FIG. 5 is an exemplary dialog box for selecting process location in accordance with the flowchart shown in FIG. 3;

FIG. 6 is an exemplary dialog box for selecting site information for a business process in accordance with the flowchart shown in FIG. 3;

FIG. 8 is an exemplary dialog box for selecting specific component data associated with a telecom component selected in FIG. 7;

FIG. 9 is an exemplary dialog box for selecting specific component data associated with a server component selected in FIG. 7;

FIG. 10 is an exemplary dialog box for selecting specific component data associated with a mainframe component selected in FIG. 7;

FIG. 11 is an exemplary dialog box for selecting specific component data associated with an internetworking component selected in FIG. 7;

FIG. 12 is an exemplary dialog box for selecting specific component data associated with workstation component selected in FIG. 7;

FIG. 13 is an exemplary dialog box for selecting process and cost information in accordance with the flowchart shown in FIG. 3;

FIG. 15 is an exemplary service panel availability report in accordance with the flowchart shown in FIG. 3;

FIG. 16 is an exemplary outlet availability report in accordance with the flowchart shown in FIG. 3;

FIG. 17 is an exemplary component availability report in accordance with the flowchart shown in FIG. 3;

FIG. 19 is an exemplary revenue and profit risk report and a revenue and profit impact report in accordance with the flowchart shown in FIG. 3.

DETAILED DESCRIPTION

Embodiments of the present invention are described herein with reference to an Internet-based system and method for estimating power availability and business process downtime of a building based on specific attributes of the building and business process components contained therein. However, as understood by one skilled in the art, the present invention is not limited to Internet-based systems and may include systems employing other networks as well as stand alone systems.

Figure 1:
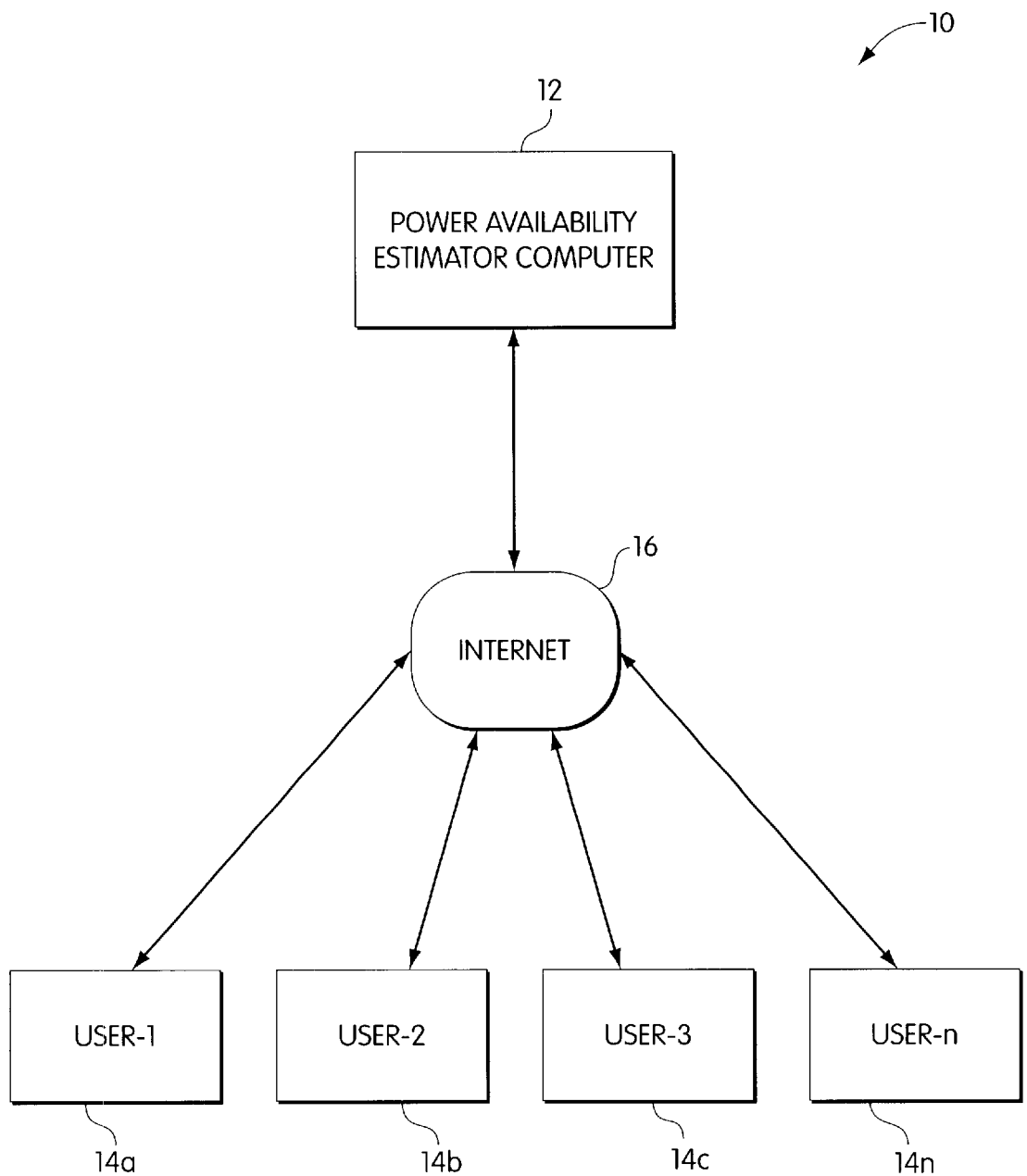
FIG. 1 is a schematic diagram of a system having principles of the present invention.

FIG. 1 shows a system 10 for estimating power availability and business process downtime in accordance with one embodiment of the present invention. The system 10 includes a power availability estimator computer 12 coupled to a plurality of user computers, 14a, 14b, 14c and 14d, via a computer network 16 such as the Internet. The power availability estimator computer 12 can comprise a conventional computer server such as an "NT-Server" or a "Unix Solaris Server." These computer servers may be programmed with conventional server software such as: "Windows Explorer", "Netscape Enterprise", "Navigator", or "Earthlink." Furthermore, these computer servers may be programmed with conventional Web page interface software such as: "Visual Basic", "Java", "JavaScript", "HTML/DHTML", "C++", "J+", "Perlscript"; or "ASP".

The power availability estimator computer 12 includes a power availability estimator engine (not shown) which calculates a number of power availability estimation values associated with a building. In an embodiment, the power availability estimator computer 12 estimates the probability that electrical power will be available for a particular building, such as an industrial building. The power availability estimator computer 12 can further estimate business process downtime which is associated with components and/or equipment defined in the user's building.

Figure 2:
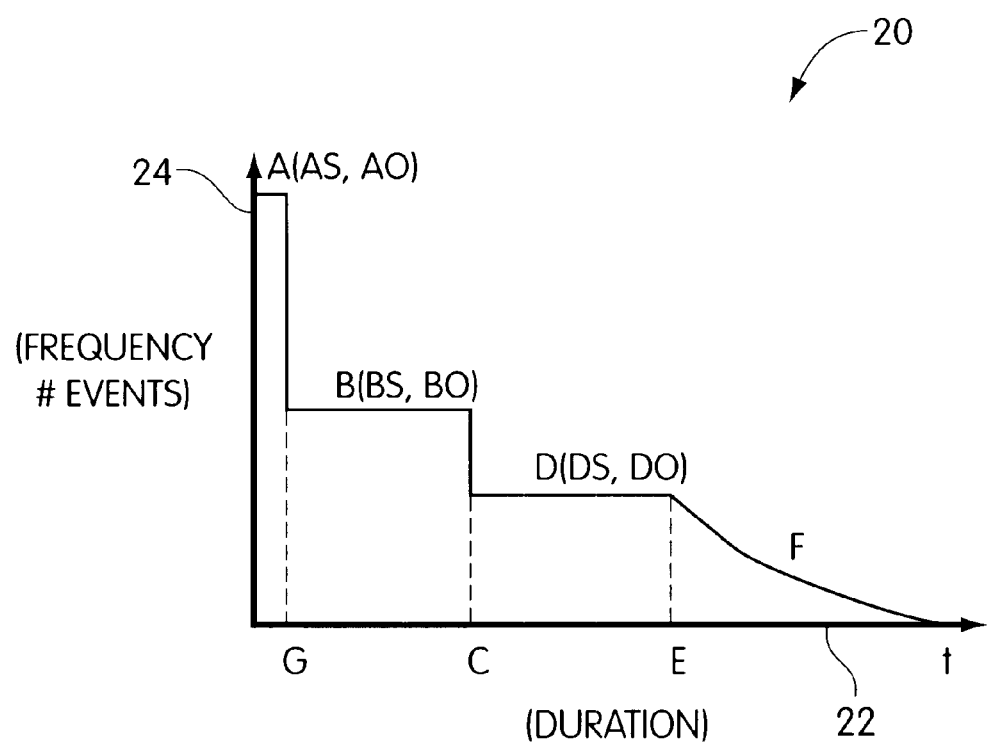
FIG. 2 is a probability density function graph.

In one embodiment of the present invention, the power availability estimator engine includes a plurality of equations that describe a probability density function ("PDF") 20 as illustrated by the graph shown in FIG. 2. The PDF graph 20 comprises a horizontal axis 22 and a vertical axis 24. The horizontal axis 22 defines the duration of electrical power events. The vertical axis 24 defines the frequency of electrical power events. Some examples of power related events can include, power outages and power sags or brown outs. The PDF graph 20 further comprises a plurality of variables including A, B, C, A, E and F, where A defines the number of events that are likely to occur which have a duration defined between time 0 and time G; where B defines the number of events that are likely to occur which have a duration defined between time G and time C; where D defines the number of events that are likely to occur which have a duration defined between time C and time E; and where F defines the time constant for how fast tie graphical distribution decays toward zero from time E out to infinity. This exponential decay from time E out to infinity is defined as $D*e^{-((T-E)/F)}$. The variable G delineates between the frequency of power events occurring under A and B; The variable C delineates between the frequency of power events occurring under B and D; and the variable E delineates between the frequency of power events occurring under D and F.

In the FIG. 2 PDF graph, events that occur under A are relatively short in duration and can be further defined as sags ("AS") and outages ("AO"). The events that occur under B are of a relatively moderate duration and can be further defined as sags ("BS") and outages ("BO") The events that occur under D are of a relatively longer duration and can be further defined as sags ("DS") and outages ("DO").

The power availability estimator engine can further include additional constants that are defined according to factors such as Bulk Power, Area Power, Local Distribution Network, Mean Time to Recover ("MTTR"), Mean Time Between Failures ("MTBF"); and Annual Failure Rate ("AFR"). The Bulk Power is defined by a combination of the Generating Stations and the very high voltage transmission networks supplying a given area. The Area Power is defined as the number and sizes of transformer stations supplying a given area. The Local Distribution Network is the local network of wiring, including neighborhood utility poles, and transformers. The MTTR is the time it takes for a component to reboot after a power event. The MTBF is a number used to calculate downtime due to failures. The AFR is used to calculate downtime due to a generator failure.

In an embodiment, the variables and constants defined in the PDF graph 20, as shown in FIG. 2, are adjusted based on particular attributes associated with a user's specific building attributes. Thereafter, the estimator engine can estimate power availability and/or downtime based on the adjusted PDF graph (not shown), which is representative of the attributes of a particular user's building. For example, geography can be a major factor that contributes to power availability and/or downtime in a particular building. Any given geography can have specific attributes that define its power quality. These attributes can include: Weather Human/Animal Error, Government Policy, (conservation), Equipment Failure, Plant Type, Configuration/Redundancy of Plants, and Overload Situations.

A base-line geography is defined using an average utility power availability of 99.98% in North America (source—IEEE 1995 Survey). For each of the above attributes, values for AS, AO, BS, BO, DS, DO, & F are determined. The attributes for all geographies will vary by a "delta" from the baseline. The deltas are established using local weather data, government policies for the region and utility reliability data. Weather data for a particular geography can include statistics on tornadoes, hurricanes, snow/ice storms, tropical storms/high winds, earthquakes, lightning, floods and extreme temperatures. This data has been collected from three sources including NOAA, Stormfax, and Global Atmospherics.

Figure 3:
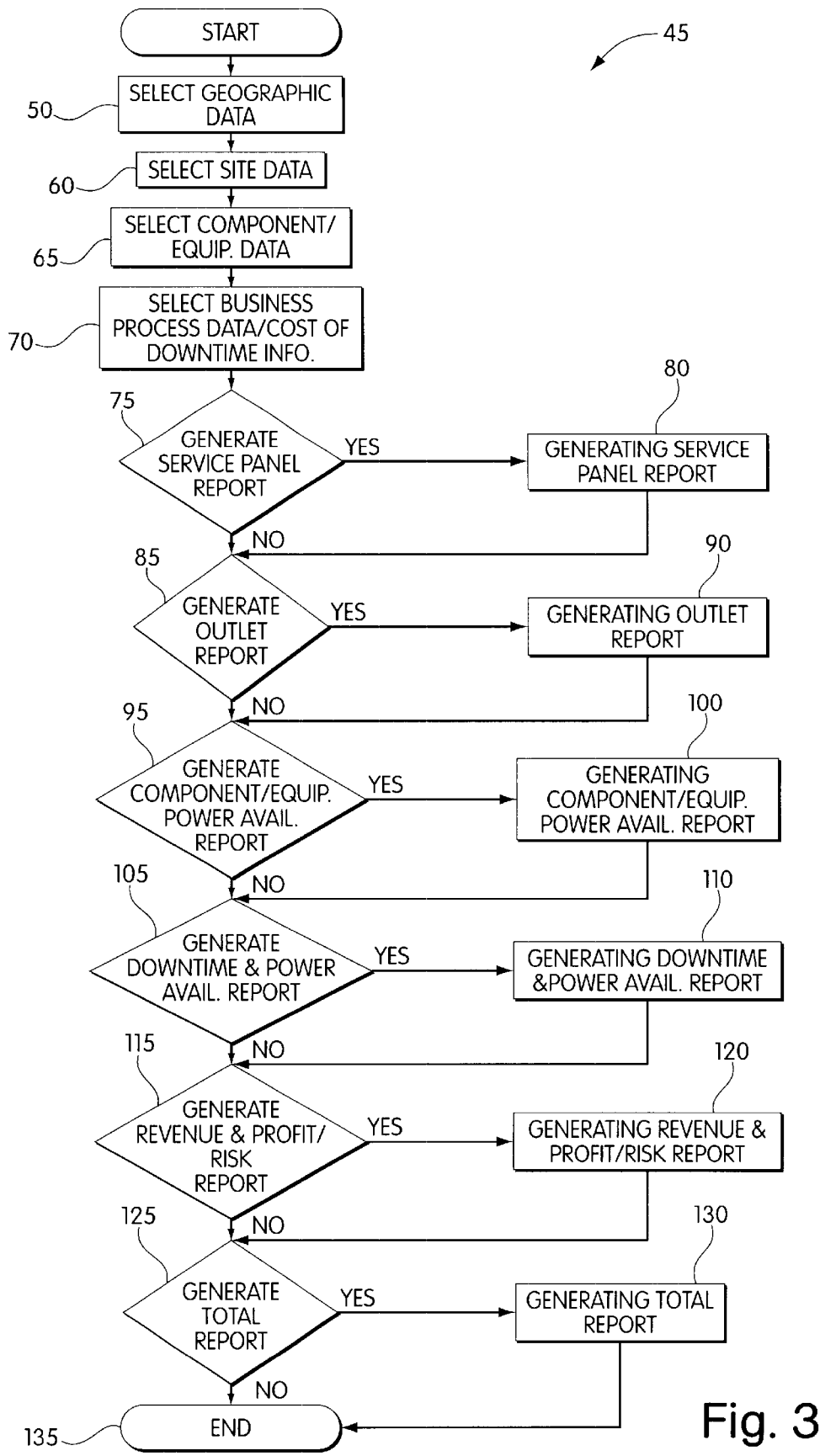
FIG. 3 is a flow chart showing process steps executable on the system shown in FIG. 1.

Referring to FIG. 3, a method 45 for using system 10 (FIG. 1) for estimating power availability and business process downtime in accordance with embodiments of the present invention will now be described. In a first step 50, a user's building location is selected. Site data is selected at step 60, which is related to the user's building. Component and/or equipment data is then selected at step 65. Business process data and costs of downtime related data is selected at step 70. At step 75, the user can elect to generate a service panel report, which is generated at step 80. At step 85, the user can elect to generate an outlet report, which is generated at step 90. At step 95, the user can elect to generate a component and/or equipment report, which is generated at step 100. At step 105, the user can elect to generate an overall business process downtime and overall power availability report, which is generated at step 110. At step 115, the user can elect to generate a revenue and profit and/or risks report, which is generated at step 120. At step 125, the user can elect to generate a total power availability and business process downtime report, which is generated at step 130 and the method ends at step 135.

Selecting geographical data at step 50 can include selecting information related to the country and particular region of a country in which the user's building is located. The user can then enter site data at step 60 which includes external building data and internal building data. The external building data further defines the user's building location such as whether the building is located in a city, suburb, or rural area. Site data can further include information related to construction in the vicinity of the user's building; distance to nearest electric substation; and whether electric service to a user's building is provided above or below ground. The internal building data includes information related to the age of the building; the age of the wiring in the building; construction within the user's building; business process expansion status; heavy equipment operating in user's building; and specific use of the user's building such as residential, office or industrial.

Selecting component and/or equipment data at step 65 can include selecting components from categories arranged in a menu. The components can include Internet devices (Hubs, Routers, and/or switches), mainframe computers, servers, telecom devices, and/or workstations. The user can select information from another menu to further describe the number of components in each selected category. The user can also select one or more of the following: the percentage of the components protected by uninterruptible power supplies ("UPS"), percentage of UPS, which protect equipment, that contain automatics voltage control, the average runtime for each UPS, the time required to reboot or restart the equipment after a power event and whether the equipment is protected by a generator and if so, the startup time of the generator.

Selecting business process data and costs of downtime related data at step 70 can include one or more of the following: selecting a number that defines the number of employees that use the business process; selecting an average annual cost per employee; selecting a percent of the employee's time which is unproductive if the business process is unavailable; selecting a number defining business process annual revenue; selecting percentage of lost revenue if business process is unavailable; selecting business process target percentage profit margins and/or selecting a number of days and a number of hours that the business process operates.

The service panel report includes a service panel power availability estimate and a service panel downtime estimate. The service panel downtime estimate is defined as a value corresponding to the number of hours per year that an electric utility, which normally provides power to the building, fails to provide sufficient power to energize a service panel that feeds the user's building. Thus, the service panel value relates to power failures that arise in a region defined external to the user's building. Accordingly, in generating the service panel report at step 80, an external probability density function ("External-PDF") is generated based on data defined external to the building. More specifically, the previously selected external site related data is assigned predetermined values from a look-up table (FIG. 4). Each value corresponds with AS, AO, BS, BO, DS, DO, & F defined within the FIG. 2 PDF graph 20. In embodiments of the present invention, these assigned values are based on various sources of power quality data, including Electronic Power Research Institute ("EPRI"), Bell Labs, Institute of Electrical and Electronic Engineers ("IEEE"), and only consider events that fall outside the Computer and Business Equipment Manufactures Association ("CBEMA") limit.

By way of example and as shown in FIG. 4, the assigned values defined in the look-up table can be subjectively estimated by a developer of the look-up table. In a specific example, a developer assigning values to an electrical service panel which is feed by above ground wiring can assign: AS, AO, A, BS, DO, B, C, DS, DO, D, E, F and G the respective values 4.50, 0.80, 5.3, 0.00100, 0.00340, 0.00440, 0, 0.0000020, 0.0000068, 0.0000088, 0, 50, and 0. In another specific example, a developer assigning values to an electrical service panel which is feed by below ground wiring can assign: AS, AO, A, BS, BO, B, C, DS, DO, D, E, F and G the respective values 1.00, 0.18, 1,18, 0.00050, 0.00170, 0.00220, 0, 0.0000008, 0.0000027, 0.0000035, 0, 25, and 0. The values assigned by the developer are based on the above described various sources of power quality data as interpreted by the developer of the look-up table. In the above example, the values associated with above ground wiring are generally greater in magnitude than values associated with below ground wiring because the various sources of power quality data suggest a greater probability of power related events associated with above ground wiring as opposed to below ground wiring.

The power availability estimator engine sums up the values of AS for external data plus the value of AS for the selected geography. The same summation occurs for AO, BS, BO, DS, DO, & F. Thereafter the PDF graph (FIG. 2) 20 is adjusted to provide the External-PDF graph (not shown) representative of the service panel downtime estimate for the particular user's building.

The outlet report includes an outlet power availability estimate and an outlet downtime estimate. The outlet downtime estimate is defined as a value corresponding to the number of hours per year that power distribution internal to the user's building fails to adequately energize outlets and other power related distribution equipment. Thus, the outlet value relates to power failures that arise in a region defined internal to the user's building. Accordingly, in generating the outlet report at step 90, an internal probability density function ("Internal-PDF") is generated based on data defined internal to the building. More specifically, the previously selected internal site related data is assigned predetermined values from a look-up table. Each value corresponds with AS, AO, BS, BO, DS, DO, & F defined within the FIG. 2 PDF graph 20. Thereafter, the above described summation process previously executed for the external site related data is repeated herein for the internal site related data. Thereafter the PDF graph 20 (FIG. 2) is adjusted to provide an Internal-PDF graph (not shown) representative of the outlet downtime estimate for the particular user's building.

FIG. 4 is an exemplary look-up table including a plurality of values corresponding with AS, AO, BS, BO, DS, DO, & F defined within the FIG. 2 PDF graph 20. A number of these values can be selected and summed in accordance with that described above in order to generate the External-PDF and/or the Internal-PDF graphs.

The downtime estimate of the region defined external the user's building or service panel downtime is calculated by subjecting the External-PDF graph to equations (1) and (2) below. The downtime estimate of the region defined internal the user's building or outlet downtime is calculated by subjecting the Internal-PDF graph to equations (1) and (2) below. In subjecting the External-PDF graph and the Internal-PDF graph to equations (1) and (2), the formula t*F(t) is integrated from time zero to time infinity for each of the PDF graphs, where F(t) is as follows:

$F(t)=A$ from $t=0$ to $t=G$ $F(t)=B$ from $t=G$ to $t=C$ $F(t)=D$ from $t=C$ to $t=E$ $F(t)=D*e^{-((T-E)/F)}$ from $t=E$ to $t=\infty$ (Equation 1)

The integral of $t*F(t)=\frac{1}{2}*A*G^2+\frac{1}{2}*B*(C^2-G^2)+\frac{1}{2}*D*(E^2-C^2)+F*D*(E+F)$ (Equation 2)

Plugging in the values of A, B, C, D, E, F, G into the above integral gives the total seconds of downtime in one year. First the number is converted into hours by dividing by 3600 seconds/hour. Thereafter, the previously calculated service panel downtime and outlet downtime can be respectively used to calculate the service panel availability and outlet availability in accordance with Equation 3 as below:

Availability=(Total Hrs in 1 Year−Total Downtime in 1 Year)/Total Hrs in 1 Year (Equation 3)

The percentage of downtime caused internally vs externally can then be determined in accordance with the definitions below:

% External=Service Panel Downtime/Outlet Downtime.

% Internal=(Outlet Downtime−Service Panel Downtime)/Outlet Downtime

When a basic UPS is used to protect equipment, the PDF graph 20 shown in FIG. 2 is shifted to the left by the amount of runtime of the UPS. In other words, the values of G, C, and E are decreased by the runtime of the UPS. If the runtime is greater than the values of G, C and/or E, the values go to zero.

When a UPS with Automatic Voltage Regulation ("AVR") is used in the user's building, in addition to shifting the values to the left by the runtime, the values of A, B, & D are lowered by the value of the sags (AS, BS, DS) since AVR may be used to eliminate all sags regardless of duration.

Additionally, PDF graphs can be shifted to the right by the reboot time of the equipment. The PDF graphs can be shifted to the right because the true duration of each event is the duration of the event plus the time to reboot that equipment. Further, the use of generators impacts the business process availability in different ways depending on the protection scheme. Failure rates of UPSs and generators are also taken into account. In summary, predetermined values, which can be contained in a look-up table, can be assigned to the UPS runtime characteristics; AVR characteristics of the UPS; reboot time of the equipment; use of generators; and the failure rates of both the UPS and the generator. The values can be used to adjust the FIG. 2 PDF graph 20 to provide a Component-PDF graph (not shown).

Generating the component and/or equipment availability report at step 100, comprises the step of executing at least one group of equations set forth below, the groups include, Group-I; Group-II; Group-III; Group-IV; and/or Group-V. Group-I includes Equation 4, Group-II includes Equation 5 through Equation 10, Group-III includes Equation 11 through Equation 14; Group-IV includes Equation 15 through Equation 21; and Group-V includes Equation 22–25. One or more of the above described groups of equations can be selected for execution by the estimator engine based on previous step of selecting component and/or equipment data, such as whether components are protected by a UPS, generator, or both.

After selecting a group of equations, the equations defined in the group are executed in conjunction with values defined in the Component-PDF graph to provide a component availability report. The groups of equations comprise:

Group-I (IF UPS=NO & GENERATOR=NO)

$\frac{1}{2}*A*[(G+MTTR)^2-MTTR^2]+\frac{1}{2}*B*[(C+MTTR)^2-(G+MTTR)^2]+\frac{1}{2}*D[(E+MTTR)^2-(C+MTTR)^2+[D*F*(E+MTTR+F)]$ (Equation 4)

Group-II (IF UPS=NO & GENERATOR=YES)

If Generator Startup<=$G \Rightarrow [\frac{1}{2}*A*[(\text{Generator startup}+MTTR)^2-MTTR^2]+(\text{Generator Startup}+MTTR)*(\# \text{Events>Startup})]*(1-AFR)+AFR*$(Equation 4) (Equation 5)

If Generator Startup>$G$ and<=$C \Rightarrow [\frac{1}{2}*A*[(G+MTTR)^2-MTTR^2]+\frac{1}{2}*B*[(\text{Generator Startup}+MTTR)^2-(G+MTTR)^2]+(\text{Generator Startup}+MTTR)*(\#\text{Events>Startup})]*(1-AFR)+AFR*$ (Equation 4) (Equation 6)

If Generator Startup>$C$ and<=$E \Rightarrow [\frac{1}{2}*A*[(G+MTTR)^2-MTTR^2]+\frac{1}{2}*B*[(C+MTTR)^2-(G+MTTR)^2]+\frac{1}{2}*D*[(\text{Generator Startup}+MTTR)^2-(C+MTTR)^2]+(\text{Generator Startup}+MTTR)*(\# \text{Events>Startup})]*(1-AFR)+AFR*$(Equation 4) (Equation 7)

Where # of Events>Startup is calculated as follows:

If Generator Startup<$G \Rightarrow A*(G-\text{Generator Startup})+B*(C-G)+D*(E-C)+DF$ (Equation 8)

If Generator Startup>=$G$ and <$C \Rightarrow B*(C-\text{Generator Startup})+D*(E-C)+DF$ (Equation 9)

If Generator Startup>=$C$ and <$E \Rightarrow D*(\text{Generator Startup})+DF$ (Equation 10)

Note, the generator startup time must be <E

Group-III (IF UPS=YES & GENERATOR=NO)

If runtime<time $G \Rightarrow [\frac{1}{2}*A*[(G-\text{Runtime}+MTTR)^2-MTTR^2]+\frac{1}{2}*B*[(C-\text{Runtime}+MTTR)^2-(G-\text{Runtime}+MTTR)^2]+\frac{1}{2}*D*$ $[(E-\text{Runtime}+MTTR)^2-(C-\text{Runtime}+MTTR)^2]+F*D*[(E-\text{Runtime}+MTTR)+F]]+$Downtime due to UPS failures (Equation 11)

If runtime$\geq G$ and $<C \Rightarrow [\frac{1}{2}*B*[(C-\text{Runtime}+MTTR)^2-MTTR^2]+\frac{1}{2}*D*[(E-\text{Runtime}+MTTR)^2-(C-\text{Runtime}+MTTR)^2]+F*D*[(E-\text{Runtime}+MTTR)+F]]+$
Downtime due to UPS Failures (Equation 12)

If runtime$>C$ and $<E \Rightarrow [\frac{1}{2}*D*[(E-\text{Runtime}+MTTR)^2-MTTR^2]+F*D*[(E-\text{Runtime}+MTTR)+F]]+$
Downtime due to UPS Failures (Equation 13)

If runtime$\geq E \Rightarrow [F*D*(F+MTTR)*e^{[(E-Runtime)/F]}]+$Downtime due to UPS Failures (Equation 14)

Group-IV (IF UPS=YES & GENERATOR=YES)

If Runtime of UPS>Generator Startup$\Rightarrow 0*(1-AFR)+AFR*$(Equation 11–14)+
Downtime due to UPS Failures (Equation 15)

If Runtime of UPS<Generator Startup, 6 cases are possible:

If Runtime<$G$ and Generator Startup<=$G$ $[\frac{1}{2}*A*[(\text{Generator Startup}+MTTR)^2-(\text{Runtime}+MTTR)^2]]*(1-AFR)+AFR*$(Equation 11–14)+Downtime due to UPS Failures (Equation 16)

If Runtime<$G$ and Generator Startup>$G$ &<=$C[\frac{1}{2}*A*[(G+MTTR)^2-$ $(\text{Runtime}+MTTR)^2]+\frac{1}{2}*B*[(\text{Generator Startup}+MTTR)^2-(G+MTTR)^2]]$ $*(1-AFR)+AFR*$(Equation 11–14)+
Downtime due to UPS Failures (Equation 17)

If Runtime<$G$ and Generator Startup>$C$ &<=$E[\frac{1}{2}*A*[(G+MTTR)^2-(\text{Runtime}+MTTR)^2]+\frac{1}{2}*B*[(C+MTTR)^2$ $-(G+MTTR)^2]+\frac{1}{2}*D*[(\text{Generator Startup}+MTTR)^2-(C+MTTR)^2]]$ $*(1-AFR)+AFR*$(Equation 11–14)+
Downtime due to UPS Failures (Equation 18)

If Runtime>=$G$ & <$C$ and Generator Startup>$G$ &<=$C[\frac{1}{2}*B*[(\text{Generator Startup}+MTTR)^2-(\text{Runtime}+MTTR)^2]]*(1-AFR)+AFR*$(Equation 11–14)+
Downtime due to UPS Failures (Equation 19)

If Runtime>=$G$ & <$C$ and Generator Startup>$C$ &<=$E[\frac{1}{2}*B*[(C+MTTR)$ $^2-(\text{Runtime}+MTTR)^2]+\frac{1}{2}*D*[(\text{Generator Startup}+MTTR)^2-(C+MTTR)^2$ $]]*(1-AFR)+AFR*$(Equation 11–14)+Downtime due to UPS Failures (Equation 20)

If Runtime>=$C$ & <$E$ and Generator Startup>$C$ &<=$E[\frac{1}{2}*D*[(\text{Generator Startup}+MTTR)^2-(\text{Runtime}+MTTR)^2]]*(1-AFR)+AFR*$(Equation 11–14)+
Downtime due to UPS Failures (Equation 21)

Group-V (Calculating Downtime due to UPS Failures)

For every case where a UPS is used, the downtime due to UPS Failures is added to the fourth PDF graph.

Downtime caused by UPS failures=[$MTTR$ (sec) of Equipment/$MTBF$ of UPSs (sec)]*Sec/Year (Equation 22)

In each equipment category (PCs, Servers, Hubs/Routers/Switches, Mainframes, and/or Phone Systems), there can be 3 PDF graphs (not shown) including: PDF graph for equipment with No UPS; PDF graph for equipment with a Basic UPS; and a PDF graph for equipment with a UPS with AVR.

The downtimes for each equipment category are calculated in seconds in accordance with Equation 22 above. Each calculated downtime value can be converted to hours by dividing by 3600 seconds/hr. Thereafter, the equipment category availability can be calculated using Equation 3 above.

For example, in calculating the availability of all PCs in the process, a weighted average can be used. The weighted average is based on the percent of PCs with no UPS, the percent of PCs with basic UPS, and the percent of PCs with a UPS with AVR The same holds true for Servers, Hubs/Routers/Switches, Mainframes, and Phone Systems. The availability of all PCs in the process is calculating in accordance with Equation 23 set forth below:

PC Availability=(% PCs with no UPS*Availability with no UPS )+(% PCs with basic UPS*Availability with basic UPS )+(% PCs with UPS with AVR*Availability with UPS with AVR) (Equation 23)

Once the availability of all PCs in the process is calculated, the downtime can be calculated in accordance with Equation 24:

PC Downtime=8760-(PC Availability*8760) (Equation 24)

The downtime and availability that were just calculated assume the process is running 7-days per week and 24-hours/day. This is not always the case, however, so the downtime is multiplied by the % of time the process is operating. Then with the adjusted downtime, the new availability can be calculated using Equation 25 below:

Downtime while process is Active=Downtime*[(Hrs/Day*Days/Week)/Total Hrs in Week] (Equation 25)

Annual overall business process downtime is defined by a value of time associated with the component, which is defined within the business process, that yields the least or minimum availability due to power faults. In other words, the annual overall business process downtime is defined by a value of time associated with the component having the maximum or greatest downtime due to power faults. Therefore, generating the business process downtime and process or power availability report at step 110 comprises generating the business process downtime by determining the lowest availability value of all components that make up that entire business process. For example, if the annual estimated downtime for internetworking devices is 30-hours, mainframe computers is 36-hours, server computers is 35-hours, telecom devices 22-hour, and/or work stations is 50-hours, then the worst case or lowest power availability of all components which makes up that entire business process is 50-hours. The step of generating the business process downtime and power availability report comprises executing Equation 26 below:

Process or Power Availability=MINIMUM(PC Availability, Server Availability, Hubs/Routers Availability, Mainframes Availability, Phone Systems Availability) (Equation 26)

Generating the revenue, profit and/or risks report at step 120 comprises calculating the revenue loss due to productivity loss per hour in accordance with Equation 27 and calculating revenue loss per hour in accordance with Equation 28.

Revenue Loss due to Productivity Loss per Hour=[(# of Employees*Average Annual Cost per Employee*% of time Wasted)/# of Hours process is operating in one year]/Margin % (Equation 27)

Revenue Loss per Hour=(Revenue generated by process*% that cannot be recovered)/# of Hours process is operating in one year (Equation 28)

Generating the revenue, profit and/or risks report at step 120 further comprises calculating total revenue loss per hour in accordance with Equation 29; calculating total profit loss per hour in accordance with Equation 30; calculating total revenue dollars at risk in accordance with Equation 31; and calculating the total profit dollars at risk in accordance with Equation 32.

Total Revenue Loss per Hour=Revenue Loss due to Productivity
  Loss per Flour+Revenue Loss per Hour   (Equation 29)

Total Profit Loss per Hour=(Revenue Loss per Hour*Margin %)+
  [(# of Employees*Average Annual Cost per Employee*% of
  time Wasted)/# of Hours process
  is operating in one year]   (Equation 30)

Total Revenue $ at Risk=Total Loss per Hour*
  Total Downtime   (Equation 31)

Total Profit $ at Risk=Total Profit Loss per Hour*
  Total Downtime   (Equation 32)

Generating the total power availability report at step 130 comprises concatenating the service panel report generated at step 80; outlet report generated at step 90; component and/or equipment report generated at step 100; business process availability report generated at step 110; and revenue, profit and/or risks report generated at step 120 to provide the total power availability report generated at step 130.

A plurality of exemplary dialog boxes, web-pages and/or reports as shown below in FIGS. 5–19 can be provided to one or more of the user computers 14a, 14b, 14c and/or 14d by the power availability estimator computer 12. Each of the exemplary dialog boxes, web-pages and/or reports can be displayed by one or more of the user computers 14a, 14b, 14c and/or 14d to enable the user to enter data therein or view the contents thereof.

More specifically, FIG. 5 is an exemplary dialog box for selecting business process location in accordance with step 50 of the flowchart shown in FIG. 3. Business process location can include information such as whether a user's building is located in the United States and if so, which region of the United States as well as a particular state.

FIG. 6 is an exemplary dialog box for selecting site information for a business process in accordance with step 60 of the flowchart shown in FIG. 3. The site information dialog box enables a user to further define attributes of their particular building. Specifically and as shown in FIG. 6, the user can select information such as: the city, suburb, and/or rural area that their building is located Further, the user can select other information related to construction in the area of their building; distance to nearest substation, type of wiring that feeds their building (above or below ground); building uses, i.e., office, industrial, and/or residential; age of the building; age of the wiring; current construction in building; heavy equipment operating in building; business process expansion in their building; and building standards information.

Figure 7:
FIG. 7 is an exemplary dialog box for selecting components of a business process in accordance with the flowchart shown in FIG. 3.

FIG. 7 is an exemplary dialog box for selecting components of a business process in accordance with step 65 of the flowchart shown in FIG. 3. The components of a business process dialog box enables a user to select components, which are included in their business process, from preformed equipment list. The preformed equipment list, as shown in FIG. 7, includes Internetworking Devices, Mainframes, Servers, Telecom Devices, and Work Stations. In addition, the user can specify other equipment that is not included in the preformed equipment list.

FIG. 8 is an exemplary dialog box for selecting specific component data associated with an internetworking component selected in FIG. 7. Specific component data can include the number of components used in the user's business process; percentage of those components which are protected by one or more UPSs; percentage of UPSs that include AVR; average runtime for the UPSs; the amount of time required to reboot the components after a power event; components protected by a generator and associated generator start-up time.

FIG. 9 is an exemplary dialog box for selecting specific component data associated with a mainframe component selected in FIG. 7. Specific component data can include similar information as that described above with respect to FIG. 8.

FIG. 10 is an exemplary dialog box for selecting specific component data associated with a server component selected in FIG. 7. Specific component data can include similar information as that described above with respect to FIG. 8.

FIG. 11 is an exemplary dialog box for selecting specific component data associated with a telecom component selected in FIG. 7. Specific component data can include similar information as that described above with respect to FIG. 8.

FIG. 12 is an exemplary dialog box for selecting specific component data associated with workstation component selected in FIG. 7. Specific component data can include similar information as that described above with respect to FIG. 8.

FIG. 13 is an exemplary dialog box for selecting business process and cost information in accordance with step 70 of the flowchart shown in FIG. 3. Process and cost information can include the number of employees associated with the user's building; average annual cost per employee; and the percentage of employee time rendered unproductive if the user's business process is unavailable. Further, the user can select information related to annual revenue; percentage of revenue that is unrecoverable in the event that the user's business process in unavailable as well as target profit margins for the user's business process. The user can also select information indicating the number of days and hours that the business process operates.

Figure 14:
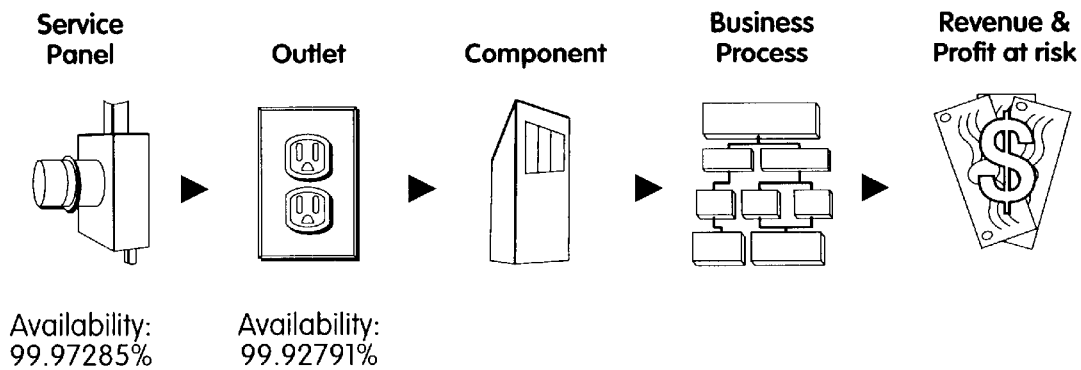
FIG. 14 is an exemplary web-page containing a plurality of active icons associated with the generation of business process reports in accordance with the flowchart shown in FIG. 3.

FIG. 14 is an exemplary web-page containing a plurality of active icons associated with the generation of business process reports in accordance with the flowchart shown in FIG. 3. In selecting any one the active icons, the user can generate an associated report. The reports include: a service panel report; an outlet report; a components report; a business process availability report; and a revenue and profit at risk report.

FIG. 15 is an exemplary service panel availability report generated in accordance with step 80 of the flowchart shown in FIG. 3. The service panel availability report includes a yearly service panel power availability estimate and a yearly service panel downtime estimate. The availability and downtime estimates associated with the service panel report respectively define the amount of time per year that a user's power is available for a user's business process and the amount of time per year that a user's business process is unavailable or down because of power failures. The values of availability and downtime, which are defined in the service panel report, are calculated in part based on data defined in data fields 1–4 of FIG. 6.

FIG. 16 is an exemplary outlet availability report generated in accordance with step 90 of the flowchart shown in FIG. 3. The outlet availability report includes a yearly outlet power availability estimate and a yearly outlet downtime estimate. Similar to the service panel report, the availability estimate associated with the outlet report defines the amount of time per year that a user's outlets and other related power distribution related equipment fail to provide power to components or equipment associated with the user's business process. The outlet downtime estimate is defined as the amount of time per year that the user's business process is down due to the aforementioned failure to provide power to said components or equipment. However, the values of the downtime and availability associated with the outlet report are calculated in part based on data defined in data fields 5–11 of FIG. 6.

FIG. 17 is an exemplary component availability report generated in accordance with step 100 of the flowchart shown in FIG. 3. The component availability report includes components previously selected in FIG. 6. Specifically, the report includes Internetworking components and associated yearly power availability percentage; Mainframe components and associated yearly availability percentage; Server components and associated yearly power availability percentage; Telecom components and associated yearly power availability percentage; and Workstation components and associated yearly power availability percentage. Each component and associated yearly power availability percentage is calculated in part based on data defined in data fields associated with FIGS. 7–12.

Figure 18:
FIG. 18 is an exemplary business process downtime and power availability report in accordance with the flowchart shown in FIG. 3.

FIG. 18 is an exemplary overall business process downtime and overall power availability report generated in accordance with step 110 of the flowchart shown in FIG. 3. The overall business process downtime and overall power availability report includes an estimated annual business process downtime which is based on the worst case or maximum downtime value of one component contained in the user's business process. Further, the report includes an overall process or power availability estimate which is defined by a value associated with one component selected from the category of components, as shown in FIG. 17, which has a minimum power availability percentage.

FIG. 19 is an exemplary revenue and profit at risk report generated in accordance with step 120 of the flowchart shown in FIG. 3. The revenue and profit at risk report includes revenue and profit values related to revenue loss per hour due to lack of employee productively; revenue loss per hour; profit loss per hour; and total estimated downtime. The report further includes total yearly revenue at risk and total annual profit at risk.

There are many advantages to the present invention including a method and system that enables a user to forecast and/or estimate an annual availability and downtime of their business. This availability and downtime of the user's business is estimated based on particular attributes of the users building or plant. In estimating the annual business process availability and downtime, the user can generate reports containing information such as business production, profits, and losses.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of estimating power availability, the method of estimating power availability comprising the steps of:
   selecting geographical data, the geographical data corresponding to a building location;
   selecting site data, the site data being related to a building defined at the building location;
   selecting component data, the component data defining components included in the building;
   selecting business process data and costs of downtime data;
   using the geographical data, the site data, and the component data to determine power availability data; and
   generating a report including the power availability data.

2. The method of claim 1, further comprising the steps of:
   estimating business process downtime; and
   generating a report including downtime data.

3. The method of claim 2, wherein the step of selecting site data further comprises selecting data defined external to the building.

4. The method of claim 3, further comprising the step of selecting data defined internal to the building.

5. The method of claim 2, wherein the step of selecting component data includes selecting one or more categories of components from a predetermined component menu.

6. The method of claim 5, further comprising the steps of:
   (i) selecting a number of components defined in the selected category of components;
   (ii) selecting a percentage of components protected by an uninterruptible power supply;
   (iii) selecting a percentage of uninterruptible power supplies including automatic voltage regulation;
   (iv) selecting the average runtime for the uninterruptible power supply;
   (v) selecting if a generator is coupled to the components and an associated start-up time of the generator; and
   (vi) repeating steps (i) through (v) for each of the selected categories of components.

7. The method of claim 2, wherein the step of selecting business process data and costs of downtime data further comprises the steps of:
   (i) selecting a numerical value, the value defining a number of employees that use the business process;
   (ii) selecting an average annual cost per employee;
   (iii) selecting a percent value, the percentage value defining a percentage of employees time which is unproductive if the business process is unavailable;
   (iv) selecting a number defining business process annual revenue;
   (v) selecting a percentage of lost revenue if business process is unavailable;
   (vi) selecting a business process target percentage profit margins; and
   (vii) selecting a number of days and a number of hours that the business process operates.

8. The method of claim 4, further comprising the steps of:
   generating an external probability density function ("External-PDF") based on data defined external to the building; and
   generating a service panel report, the service panel report including a service panel power availability estimate and a service panel downtime estimate, the service panel power availability estimate and the service panel downtime estimate being calculated based on the External-PDF.

9. The method of claim 8, further comprising the steps of:
   generating an internal probability density function ("Internal-PDF") based on data defined internal to the building; and
   generating an outlet report, the outlet report including an outlet power availability estimate and an outlet downtime estimate, the outlet power availability estimate and the outlet downtime estimate being calculated based on the internal-PDF.

10. The method of claim 6, further comprising the steps of:
   generating a component probability density function ("Component-PDF") based on the selected component data; and generating a component and/or equipment report, the component and/or equipment report including a plurality of component and/or equipment power availability estimates, each component and/or equipment power availability estimate being associated with one component selected from the category of components, each power availability estimate associated with each component being calculated based on the Component-PDF.

11. The method of claim 10, further comprising the steps of:
    generating an overall business process downtime and overall power availability report, the report including an overall business process downtime estimate and an overall power availability estimate.

12. The method of claim 11, wherein the overall business process downtime estimate is defined by a value of time associated with one component selected from the category of components which has a maximum downtime.

13. The method of claim 11, wherein the overall power availability estimate is defined by a value associated with one component selected from the category of components which has a minimum power availability.

14. The method of claim 7, further comprising the steps of:
    generating a revenue and profit at risk report, the revenue and profit at risk report including a total annual revenue at risk value estimate and a total annual profit at risk value estimate.

15. A power availability estimation system comprising;
    a power availability estimator computer; and
    a plurality of user computers coupled to the power availability estimator computer via a computer network;
    wherein the power availability estimator computer includes a power availability estimator engine; and
    wherein the power availability estimator engine includes a probability density function including a duration of electrical power events and a frequency of electrical power events.

16. A system coupled to a computer network for receiving information over the network and for estimating power availability based on the information, the system comprising:
    a processor, the processor being operatively coupled to the network to receive the information; and
    means for estimating power availability of a predetermined site, the site having characteristics defined by the information;
    wherein the means for estimating power availability includes a power availability estimation computer having a power availability estimator engine; and
    wherein the means for estimating power availability further includes:
        means for selecting geographical data, the geographical data corresponding to the building location;
        means for selecting site data, the site data being related to a building defined at the building location;
        means for selecting component data, the component data defining components included in the building;
        means for selecting business process data and costs of downtime data; and
        means for generating a report including power availability data.

17. The system for estimating power availability of claim 16, further comprising:
    means for estimating business process downtime; and
    means for generating a report including downtime data.

18. The system for estimating power availability of claim 16, wherein the means for selecting site data further comprises means for selecting data defined external to the building.

19. The system for estimating power availability of claim 18, further comprising a means for selecting data defined internal to the building.

20. The system for estimating power availability of claim 19, further comprising:
    means for generating an external probability density function ("External-PDF") based on data defined external to the building; and
    means for generating a service panel report, the service panel report including a service panel power availability estimate and a service panel downtime estimate, the service panel power availability estimate and the service panel downtime estimate being calculated based on the External-PDF.

21. The system for estimating power availability of claim 20, further comprising:
    means for generating an internal probability density function ("Internal-PDF") based on data defined internal to the building; and
    means for generating an outlet report, the outlet report including an outlet power availability estimate and an outlet downtime estimate, the outlet power availability estimate and the outlet downtime estimate being calculated based on the internal-PDF.

22. The system for estimating power availability of claim 16, wherein the means for selecting component data includes means for selecting one or more categories of components from a predetermined component menu.

23. The system for estimating power availability of claim 22, further comprising:
    (i) means for selecting a number of components defined in the selected category of components;
    (ii) means for selecting a percentage of components protected by an uninterruptible power supply;
    (iii) means for selecting a percentage of uninterruptible power supplies including automatic voltage regulation;
    (iv) means for selecting the average runtime for the uninterruptible power supply;
    (v) means for selecting if a generator is coupled to the components and an associated start-up time of the generator; and
    (vi) means for repeating steps (i) through (v) for each of the selected categories of components.

24. The system for estimating power availability of claim 23, further comprising:
    means for generating a component probability density function ("Component-PDF") based on the selected component data; and
    means for generating a component and/or equipment report, the component and/or equipment report including a plurality of component and/or equipment power availability estimates, each component and/or equipment power availability estimate being associated with one component selected from the category of components, each power availability estimate associated with each component being calculated based on the component-PDF.

25. The system for estimating power availability of claim 24, further comprises:
    means for generating an overall business process downtime and an overall power availability report, the report including an overall business process downtime estimate and an overall power availability estimate.

26. The system for estimating power availability of claim 25, wherein the overall business process downtime estimate is defined by a value of time associated with one component selected from the category of components which has a maximum downtime.

27. The system for estimating power availability of claim 25, wherein the overall power availability estimate is defined by a value associated with one component selected from the category of components which has a minimum power availability.

28. The system for estimating power availability of claim 16, wherein the means for selecting business process data and costs of downtime data further comprises:

(i) means for selecting a numerical value, the value defining a number of employees that use the business process;

(ii) means for selecting an average annual cost per employee;

(iii) means for selecting a percent value, the percentage value defining a percentage of employees time which is unproductive if the business process is unavailable;

(iv) means for selecting a number defining business process annual revenue;

(v) means for selecting a percentage of lost revenue if business process is unavailable;

(vi) means for selecting a business process target percentage profit margins; and (vii) means for selecting a number of days and a number of hours that the business process operates.

29. The system for estimating power availability of claim 28, further comprises:

means for generating a revenue and profit at risk report, the revenue and profit at risk report including a total annual revenue at risk value estimate and a total annual profit at risk value estimate.

* * * * *